United States Patent [19]

Hanari et al.

[11] Patent Number: 4,981,938

[45] Date of Patent: Jan. 1, 1991

[54] HIGHLY CRYSTALLINE POLYPROPYLENE

[75] Inventors: Tohru Hanari; Ichiro Namiki, both of Ichiharashi; Kinya Mori, Chibashi; Hiromasa Chiba; Kiyoshi Matsuda, both of Ichiharashi, all of Japan

[73] Assignee: Chisso Corporation, Japan

[21] Appl. No.: 150,309

[22] Filed: Jan. 29, 1988

[30] Foreign Application Priority Data

Feb. 4, 1987 [JP] Japan .................. 62-23889

[51] Int. Cl.$^5$ .............................................. C08F 10/06
[52] U.S. Cl. ................... 526/351; 524/582; 524/583; 524/584; 525/323; 526/142; 526/904; 526/905
[58] Field of Search ..................................... 526/351

[56] References Cited

U.S. PATENT DOCUMENTS

| | | | |
|---|---|---|---|
| 4,449,247 | 2/1985 | Chiba et al. | 526/351 |
| 4,500,682 | 2/1985 | Chiba et al. | 526/351 |
| 4,522,994 | 6/1985 | Chiba et al. | 526/351 |
| 4,550,144 | 10/1985 | Chiba et al. | 525/247 |
| 4,560,734 | 12/1985 | Fujishita et al. | 526/351 |
| 4,582,878 | 4/1986 | Chiba et al. | 526/351 |

FOREIGN PATENT DOCUMENTS

| | | | |
|---|---|---|---|
| 55-123637 | 9/1980 | Japan | 526/351 |
| 57-190006 | 11/1982 | Japan | 526/351 |
| 58-173141 | 10/1983 | Japan | 526/351 |
| 59-149907 | 8/1984 | Japan | 526/351 |
| 59-172507 | 9/1984 | Japan | 526/351 |
| 60-195109 | 10/1985 | Japan | 526/351 |

*Primary Examiner*—Edward J. Smith
*Attorney, Agent, or Firm*—Leydig, Voit & Mayer

[57] ABSTRACT

A highly crystalline polypropylene is provided having: (A) (i) a melt flow rate (MFR) in the range of 0.1–200 g/10 minutes 230° C. and (ii) an absorbance ratio determined by infrared absorption spectroscopy, IR-$\rho$, of wave-number 997 cm$^{-1}$, $A_{997}$, to wave-number 973 cm$^{-1}$, $A_{973}$, which satisfied the equation:

$$IR\text{-}\tau \geq 0.0203 \log MFR + 0.950; \text{ and}$$

(B) (i) an IR-$\tau$ value of at least 0.97 of a component deposited initially in an amount of 2 to 3% by weight from a dilute, slowly cooled and stirred xylene solution of the polypropylene and (ii) a ratio of the weight average molecular weight of the deposited component ($M_{w1}$) to that of the polypropylene ($M_{w0}$), $M_{w1}/M_{w0}$, of at least 3.

1 Claim, No Drawings

HIGHLY CRYSTALLINE POLYPROPYLENE

BACKGROUND OF THE INVENTION

1. Field of the Invention

This invention relates to a highly crystalline polypropylene. More particularly it relates to a polypropylene having an extremely high crystallinity even when any additive for secondarily enhancing its crystallinity such as nucleating agent, etc. is not added.

2. Description of the Related Art

Crystalline polypropylene (hereinafter referred to as "PP") as a thermoplastic resin is provided with general-purpose properties due to which it is usable as parts of automobiles, domestic appliances, fibers, food-packaging materials, etc. and excellent physical properties (such as mechanical strength, stiffness, heat resistance, chemical resistance, electrical properties, etc.), and also high impact resistance can be imparted thereto in addition to the above physical properties by block-copolymerization; hence in recent years its demand has been remarkably increasing.

However, these properties have not yet been fully satisfactory depending on its applications and its use has been restricted. For example, the stiffness of injection-molded products obtained from PP, particularly the stiffness thereof in a high temperature region in the vicinity of 80° C., is inferior to those of molded products obtained from polystyrene, ABS resin, etc. and also its heat deformation-resistant temperature is low. Further, in the fields of film and fibers, too, polyester resins, etc. are superior to PP in the aspect of nerve. Thus, if it is possible to impart to a very cheap PP, the same extent of properties in the aspect of stiffness as that of these resins or impart thereto stiffness filling in the gap between PP and these resins, then it can be expected that use of PP for industrial products or industrial parts around automobiles, domestic appliances, etc. will be more extended. By enhancing the stiffness, it is possible to make its molded products thinner while the same strength is retained, which serves resources-saving. In the field of packaging of foods, etc., since highly stiff materials have small shrinkage even at high temperatures, it is possible to shorten the drying time of printing ink on the surface of film, etc. by raising its secondary processing temperature to thereby improve the operation efficiency due to speed-up on the production line. In the field of fibers such as cotton for bed-clothes, carpet, etc., by increasing the bulkiness of fibers, such effects can be expected that the feeling of fibers is improved, the elastic recovery properties are enhanced and the decrease in resilience are reduced. Any of these matters can be achieved by enhancing the stiffness of PP.

As to the prior art for enhancing the stiffness of molded products of PP, for example, there is a process of adding an organic nucleating agent such as aluminum p-tert.-butylbenzoate, 1,3,2,4-dibenzylidenesorbitol, etc., to PP, followed by molding the mixture. Further, there is another process of adding various inorganic fillers such as talc, calcium carbonate, mica, barium sulfate, asbestos, calcium silicate, etc., followed by molding. However, the former process has drawbacks that the cost not only becomes high, but also luster, impact strength, tensile strength, elongation, etc. are reduced, while the latter process has drawbacks that the light-weight properties and transparency each specific of PP are not only damaged, but also the impact strength, luster, appearance, tensile elongation, processability, etc. are reduced. Further, processes of obtaining highly stiff PP without adding any nucleating agent, inorganic filler, etc. are disclosed in Japanese patent application laid-open Nos. Sho 57-47305/ 1982, Sho 59-22131/1984, etc., but any of PPs disclosed therein are not crystalline enough to be able to develop a high stiffness.

Thus the present inventors have made extensive research on production of a PP whose molded products have a high stiffness even when a high stiffness-effecting promoter such as fillers (e.g. talc) or additives (e.g. nucleating agent) is not added and even when conventional molding conditions, not particular molding conditions, are applied, namely a PP having a primary structure exhibiting a high crystallinity. As a result, we have found that a PP having specified properties exhibits a never observed high crystallinity and when molded into various molded products, developing a high stiffness, and have completed the present invention based on this finding.

SUMMARY OF THE INVENTION

Apparent from the foregoing, an object of the present invention is to provide a highly crystalline PP from which molded products having a high stiffness can be produced.

Another product of the present invention is to provide a highly crystalline PP which can be used for applications for which conventional PPs could not have been used.

The present invention resides in:

a highly crystalline polypropylene characterized by satisfying the following conditions (A) and (B):

(A) its melt flow rate (MFR) and absorbance ratio according to the method of infrared absorption spectra (IR-$\tau$; an absorbance ratio of a wave-number of infrared rays of 997 cm$^{-1}$ to that of 973 cm$^{-1}$, i.e. $A_{997}/A_{973}$) satisfy an equation of IR-$\tau \geq 0.0203$ log MFR $+0.950$ and its MFR is in the range of 0.1 to 200; and (B) when a dilute solution of said polypropylene dissolved in xylene is slowly cooled with stirring, an initially deposited component in 2 to 3% by weight has an IR-$\tau$ value of 0.97 or more and the weight average molecular weight ($M_{wl}$) of the deposited component and that ($M_{wo}$) of said polypropylene have a ratio ($M_{wl}/M_{wo}$) of 3 or more.

DETAILED DESCRIPTION OF PREFERRED EMBODIMENTS

The constitution of the present invention will be described in more detail.

The present highly crystalline PP has a melt flow rate (MFR, g/10 minutes, 230° C.) in the range of 0.1 to 200. If the MFR is less than 0.1, the fluidity of PP at the time of melting is insufficient, while if it exceeds 200, molded products obtained therefrom is insufficient in the strength. The greatest features of the highly crystalline PP of the present invention consist in that it has a high IR-$\tau$ value and also has a specified component described later.

One of the indications of the primary structure of PP employed for defining the highly crystalline PP is IR-$\tau$. Any of the prior art such as Japanese patent application laid-open Nos. Sho 58-104905/1983, Sho 59-22913/1984, etc. mentions as a condition of obtaining a highly stiff PP, a condition that the isotactic ratio as measured by means of $^{13}$C NMR is to be on a high level. This ratio refers to an isotacticity expressed by 5 isotactic chains (5 isotactic chains as counted in terms of monomer units), whereas IR-$\tau$ refers to an isotacticity expressed by 10 or more isotactic chains as described below. As compared with the isotactic pentad ratio by means of $^{13}$C NMR, IR-$\tau$ as an indication of the quantity of a longer isotactic chain present is a most adequate indication for defining the primary structure of a highly crystalline PP.

This IR-$\tau$ refers to the ratio of the absorbance at a wave-number of 997 cm$^{-1}$ of the infrared spectrum to that at a wave-number of 973 cm$^{-1}$ thereof ($A_{997}A_{973}$). The relationship between this IR-$\tau$ and the helix structure.primary structure, particularly the isotactic chain has already been elucidated as follows:

Isotactic PP crystallizes taking a helix structure, and the higher the isotacticity of PP is (i.e. the larger the quantity of long isotactic chains present, the less the helix structure is disturbed; hence its crystallinity is greater.

The infrared absorption at 997 cm$^{31\ 1}$ has the following specific feature:

The above absorption spectrum is attributed mainly to the skeletal C—C stretching vibration (H. Tadokoro et al, J. Chem. Phys., 42, 1432 ('65)), which absorption spectrum develops in the solid state in the case of isotactic PP, while it is extinct in molten state in that case. On the other hand, in the case of atactic PP, it does not develop even in solid state. In view of these facts, the above absorption has been employed as an indication relating directly to the content of the isotactic helix (T. Miyazawa, Polym. letter, 2, 847 ('64)). Further, it has also been confirmed that this absorption spectrum develops when the length of the isotactic chain reaches 10 or more (T. Miyazawa and H. Inagaki, J. Polym. Sci., A-2, 7, 963 ('69)). The absorption spectrum at 973 cm$^{-1}$ has the following specific feature and reflects neither specified stereoregularity nor helix structure and hence it is employed as the internal standard absorption spectrum for IR-$\tau$:

This absorption spectrum is attributed to the stretching vibration of C—C as skeletal carbons of PP, but unlike the absorption spectrum at 997 cm$^{-1}$, it is not extinct even in the molten state of PP (T. Miyazawa and H. Inagaki, J. Polym. Sci., A-2, 7, 963 ('69)). Further, as to this absorption spectrum, it has also been confirmed that the propylene chains link in head-to-tail manner and the absorption spectrum develops when the chain length reaches 5 or more (T. Miyazawa and H. Inagaki, J. Polym. Sci., A-2, 7, 963 ('69)), In order to relate IR-$\tau$ to the content of the long isotactic chain, it is necessary that the isotactic chain in a sample take a helix structure as much as possible and hence it is important to make the crystallization conditions at the time of sample preparation definite and sufficiently carry out annealing (R.H. Hughes, J. Appl. Polym. Sci, 13, 417 ('69)). As to the measurement conditions according to the IR-$\tau$ measurement method of the present invention, the conditions have been sufficiently taken into consideration.

Further, since the IR-$\tau$ varies depending on MFR, it is necessary for the highly crystalline PP of the present invention to satisfy a relationship of IR-$\tau \geq 0.0203$ log MFR $+0.950$. IR-$\tau$ values less than the above one are in the range of IR-$\tau$ values exhibited by PP having conventional crystallinity. The upper limit has no particular limitation, but if the IR-$\tau$ values exceed the upper limit, stretching property is insufficient in the case of PP grade for stretching processing.

Further, the highly crystalline PP of the present invention has a novel primary structure containing a component exhibiting a surprising nucleating effectiveness. This has been confirmed from the fact that a first deposited component (hereinafter referred to as "first fraction") is separated from the highly crystalline PP according to a stirring fractionation technique mentioned later and when this first fraction is added to PP exhibiting a conventional crystallinity, the crystallinity of the conventional PP is notably improved although the level of the resulting crystallinity does not reach that of the highly crystalline PP of the present invention. The specific feature of this component in the aspect of the primary structure is as follows:

Namely, the first fraction is 2 to 3% by weight, based on the total weight of a sample, initially obtained in the determination according to the stirring fractionation technique mentioned later and has an IR-$\tau$ of 0.97 or more, and the ratio ($M_{wl}/M_{wo}$) of the weight average molecular weight ($M_{wl}$) of the first fraction to that ($M_{wo}$) of the original unfractionated PP is 3 or more. If the Ir-$\tau$ value of the first fraction is less than 0.97, the resulting PP is a PP exhibiting a conventional crystallinity. Further, the upper limit has no particular limitation, and it is unclear what extent the upper limit is to (the IR-$\tau$ value of 100% isotactic PP has never been reported). Further, if the first fraction has a ratio of the weight average molecular weight ($M_{wl}$) of the first fraction to that ($M_{wo}$) of the original unfractionated sample of less than 3, addition of such a first fraction to conventional PP exhibits no effect of improving the crystallinity of the resulting PP. The upper limit of the ratio of $M_{wl}$ to $M_{wo}$ has no particular limitation, and it is unclear what the magnitude is of the upper limit.

To the highly crystalline PP of the present invention may be added various additives added to conventional PP such as antioxidant, heat stabilizer, UV absorber, antiblocking agent, antistatic agent, metal deactivator, neutralizing agent such as metal soaps, dispersing agent, coloring agent, lubricant, various inorganic fillers (e.g. talc, mica, etc.), polyethylene (according to low, medium or high pressure process), ethylene-propylene rubber (EPR), ethylene-propylene block copolymer, etc.

The highly crystalline PP may be produced for example by using the so-called Ziegler-Natta catalyst i.e. a combination of a Ti-containing solid component& (a solid compound composed mainly of TiCl$_3$ or a solid compound having TiCl$_4$ supported on a carrier such as MgCl$_2$, etc.)with an organoaluminum compound or in some cases, a combination of the above-mentioned two components with an electron donor as a third catalyst component, and also by employing a polymerization process comprising a part of the stages where propylene is polymerized under specified conditions i.e. at a relatively low polymerization temperature (such as room temperature to about 60° C.) and substantially in the absence of a molecular weight modifier (usually hydrogen gas), according to slurry polymerization carried out in an inert solvent, bulk polymerization using propylene itself as solvent, gas phase polymerization using mainly propylene gas or the like process. Further, a process wherein a large amount of an aromatic carboxylic acid ester such as methyl p-toluylate, methyl p-anisate, etc. is used as a third catalyst component may also be employed. In this case, the process comprises a stage wherein propylene is polymerized at relatively high temperature such as 60° to 75° C. and in the presence of a certain quantity of a molecular weight modifier. According to this process, it is presumed that addition of the aromatic carboxylic acid ester broadens the molecular weight distribution of the resulting PP and also improve its stereoregularity to a large extent.

The highly crystalline PP of the present invention is constituted by a novel primary structure with which conventional PP has never been provided, and this primary structure exhibits an extremely high crystallinity which has never been observed. For example, the highly crystalline PP of the present invention exhibits the following characteristic melting and crystallization behaviors:

(i) the crystallization rate is high;
(ii) the number of crystalline nuclei generated is large;
(iii) the growth rate of spherulite is high;
(iv) the crystallinity is high and the density of solids is high;
(v) the melting point is high; and
(vi) the crystallization on-set temperature at the time of temperature-lowering and the peak top temperature measured by means of DSC apparatus are high.

When the PP having such high crystallinity is molded and processed, it is possible to notably improve the mechanical properties of the resulting molded products and also notably reduce the cost of molding and processing as follows, as compared with the case where conventional PP is used:

(i) the molded and processed products are stiff and a firm feeling can be secured;
(ii) it is possible to make the molded products thinner;
(iii) the thermal deformation and thermal softening at high temperatures are reduced;
(iv) the surface has a high hardness and a superior resistance to surface scratching;
(v) deformation under load is difficult to occur;
(vi) the chemical resistance is improved;
(vii) the linear thermal expansion coefficient is small;
(viii) the stretching-molded and processed products have a low percentage of heat shrinkage; and
(ix) at the time of secondary processing accompanied with heating, processing at higher temperatures than those employed so far is possible; hence it is possible to make the production cycle faster.

Due to the above-mentioned improvement in the performances of molded and processed products, the highly crystalline PP can be applied concretely to fields of industrial parts and products, etc. around automobiles, domestic appliances, etc. Further, by replacing polystyrene or ABS resin so far used in these fields by the cheap highly crystalline PP, it is possible to reduce the cost of the final products.

One of the effects of the present invention consists in that it has become possible to elevate the level of stiffness of PP up to that of polystyrene or ABS resin which conventional PP could not have attained, and also broaden the use applications of PP towards those of these resins. Namely, it can be expected to use the PP as heat-resistant parts, thin, highly stiff parts, etc. as enumerated below:

(i) housing for car heater, distributor cap, etc. as automobile parts and back cover for TV set, light body, cover for an electric rice cooker, etc. in appliances;
(ii) ceiling plate, vegetables box, etc. of refrigerator, highly stiff parts such as tank, cover, control box, pulsator, etc. of an electric washing machine;
(iii) parts needing heat resistivity or high stiffness such as propeller fan as general industrial parts, bath corner, caps, compact case, vessel for an electronic range, painting pallet, parts for daily commodities sanitary fixtures, etc. e.g. toothbrush handle, hairbrush handle, etc., toilet seat, toiletry goods, etc.;
(iv) biaxially oriented film, cast film, flat yarn, monofilaments, band, sheets for food tray, etc.

The present invention will be described in more detail by way of Examples. The measurement of the above-mentioned primary structure and the measurement of physical properties of the resulting molded products were carried out according to the following methods:

(1) Measurement method of IR-$\tau$:

A sample was molded into a film by preheating it for one minute and pressing for one minute by means of a press-molding machine at 200° C., followed by immediately water-cooling the film down to 20° C. to obtain a film of about 40 $\mu$ thick. This film was then placed in an annealing tube, followed by sucking in vacuo and thereafter annealing in an oil bath at 135° C. for one hour. Three small films were cut out of the annealed film, followed by measuring the absorbance ratios ($A_{997}A_{973}$) at 997 cm$^{-1}$ and 973 cm$^{-1}$ with the respective small films as samples to render the average value of the ratios as IR-$\tau$ value. The measurement of the average value was carried out by means of an infrared spectrophotometer of Perkin-Elmer 783 type.

(2) Fractionation method of the "first fraction":

In a 1 l three-neck flask was placed PP (1.8 g) and xylene (900 ml), followed by adding a phenolic antioxidant (0.9 g), heating the mixture with stirring (agitating blades: half round shape blades made of Teflon) to completely dissolve it, gradually cooling it after dissolution at a revolution number per minute of 300 rpm and lowering the temperature of the xylene solution at a temperature-descending rate of 5C°/hr when the solution temperature reached 100° C. or lower. Polymer deposition on agitating blades began and when the percentage by weight of the deposits reached 2 to 3%, agitation was stopped and the deposits adhered to the agitating blades were recovered.

(3) Measurement method of weight average molecular weight:

The weight average molecular weight was measured by means of gel permeation chromatograph (150C type (tradename) manufactured by Waters Company; measurement temperature, 135° C.; mobile phase, orthodichlorobenzene; column, TSK gel GMH 6-HT).

(4) MFR: according to JIS K 6758.

(5) Pelletization of PP powder:

As to the pelletization of PP powder obtained by polymerization, blending and granulation were carried out using the following formulation of additives unless otherwise indicated:

A phenolic heat stabilizer (4 g) and calcium stearate (4 g) were added to PP powder (4 Kg), followed by blending the mixture at room temperature for 5 minutes by means of a high speed agitating mixer (Henschel mixer (tradename)) and pelletizing the resulting blend by means of a single screw extruder having a screw bore diameter of 40 mm, to obtain pellets.

(6) Preparation of test pieces for measuring the physical properties of injection-molded products:

The sample obtained by the above pelletization was molded by means of a screw in-line type injection molding machine manufactured by Nippon Seikosho Company at a temperature of 230° C. and a mold-temperature of 50° C. to prepare a definite test piece, followed by subjecting the test piece to conditioning in a chamber of a constant humidity (RH 50%) and a constant temperature (room temperature, 23° C.) for 72 hours and using the resulting test piece for measurement of physical properties.

(7) Method of measuring the physical properties of injection-molded products:
  (i) Flexural modulus: according to JIS K 7203 (unit: Kgf/cm$^2$)
  (ii) Flexural strength: according to JIS K 7203 (unit: Kgf/cm$^2$)
  (iii) Tensile strength: according to JIS K 7113 (unit: Kgf/cm$^2$)
  (iv) Rockwell hardness (R scale): according to JIS K 7202
  (v) Heat distortion temperature (HDT): according to JIS K 7207 (4.6 Kg/cm$^2$) (unit: °C)
  (vi) Izod impact strength: according to JIS K 7110 (23° C.) (unit: Kg.cm/cm)

(8) Method of measuring the physical properties of films:
  (i) Young's modulus: according to ASTM D-888 (unit: Kgf/cm$^2$)
  (ii) Tensile yield strength: according to ASTM D-882 (unit: Kgf/mm$^2$)
  (iii) Haze: according to ASTM D-1003 (unit: %)
  (iv) Punching impact strength: according to ASTM D-781 (unit: Kgf/mm$^2$)

(9) Method of measuring the physical properties of fibers:
  Fineness: according to JIS Z 1533-1970
  Tenacity: according to JIS Z 1533-1970 (unit: g/d)
  Elongation: according to JIS Z 1533-1970 (unit: %)
  10% Young's modulus: according to JIS Z 1533-1970 (unit: g/d)
  Percentage heat shrinkage:
  (1) A filament to be measured is loaded on a metal measure or a measuring tape placed horizontally; one end of the filament is fixed, thereafter a weight of 30 to 50 g is attached onto another end and vertically hung down in inverted L manner; and in a state where the filament is stretched in the horizontal direction, gage marks are attached onto the filament at a distance of 1 m between the gage marks.
  (2) The filament having the gage marks attached thereonto is placed in an oven adjusted to a definite testing temperature and heated for 5 minutes.
  (3) The resulting filament taken out of the oven is cooled down to room temperature, followed by again measuring the distance between the gage marks of the filament according to the above-mentioned method (1) and calculating the reduction proportion of the lengths before and after heating in the oven.

$$\text{Percentage of heat shrinkage (\%)} = \frac{A - B}{A} \times 100$$

The highly crystalline PP of the present invention may be produced according to various processes. Embodiments are shown in Examples 1-9.

EXAMPLE 1

(1) Preparation of catalyst:
n-Hexane (600 ml), diethylaluminum monochloride (DEAC) (0.50 mol) and diisoamyl ether (1.30 mol) were mixed at 25° C. for one minute, followed by reacting these at the same temperature for 5 minutes to obtain a reaction liquid (I) (the molar ratio of diisoamyl ether/DEAC: 2.6). TiCl$_4$ (4.5 mols) was placed in a nitrogen gas-purged reactor, followed by heating it to 35° C., dropwise adding thereto the total quantity of the above reaction liquid (I) over 300 minutes, keeping the mixture at the same temperature for 60 minutes, raising the temperature up to 85° C., further reacting the mixture for one hour, cooling the resulting material down to room temperature, removing the supernatant, adding n-hexane (4,000 ml), removing the supernatant by decantation, four times repeating the washing operations to obtain a solid product (II) (190 g), suspending the whole of the product (II) in n-hexane (3,000 ml), adding to the suspension, diisoamyl ether (290 g) and TiCl$_4$ (350 g) at 20° C. over about one minute, reacting the mixture at 75° C. for one hour, cooling the resulting material down to room temperature (20° C.) after completion of the reaction, removing the supernatant by decantation, adding n-hexane (4,000 ml), agitating the mixture for 10 minutes, allowing it to stand still, five times repeating the operations of removing the supernatant and drying the resulting material under reduced pressure to obtain a solid product (III).

(2) Preparation of preactivated catalyst:
Into a 20 l capacity stainless reactor equipped with slant blades and purged with nitrogen gas were added n-hexane (15 l), diethylaluminum monochloride (42 g) and the solid product (III) (30 g) obtained above at room temperature (20° C.), followed by feeding propylene (30 g) at a rate of 0.5 g/min. over 60 minutes, further agitating the mixture for 8 hours, removing unreacted propylene and n-hexane under reduced pressure to obtain a pre-activated catalyst (IV) (about 1 g of propylene per g of the solid product (III), reacted).

(3) Propylene polymerization:
Into a 250 l capacity stainless polymerization vessel equipped with turbine type agitating blades and purged with nitrogen gas were fed n-hexane (100 l) and then diethylaluminum monochloride (20 g), the preactivated catalyst (IV) (40 g) obtained above and methyl p-toluylate (20.0 g) as an aromatic carboxylic acid ester, followed by raisin9 the temperature up to 40° C., feeding propylene to raise the total pressure up to 10 Kg/cm$^2$G, polymerizing it at 40° C., under 10 Kg/cm$^2$G and for 15 minutes, and further as a second stage polymerization, adding hydrogen (250 Nl), raising the temperature up to 50° C. and continuing polymerization for 3 hours and 45 minutes, thereafter feeding methanol (25 l), raising the temperature up to 90° C., after 30 minutes, adding a 20% by weight NaOH aqueous solution (100 g), agitating the mixture for 20 minutes, adding purified water (50 l), discharging residual propylene, withdrawing the resulting aqueous layer, adding purified water (50 l), water-washing the mixture with stirring for 10 minutes, withdrawing the aqueous layer, again adding purified water (50 l), water-washing the mixture with stirring for 10 minutes, withdrawing the aqueous phase, then withdrawing a PP-n-hexane slurry, filtering it and drying to obtain PP powder (MFR = 1.4, yield 35 Kg).

COMPARATIVE EXAMPLE 1

Propylene was polymerized under the preparation conditions indicated in Table 1 mentioned later to obtain PP powder (32 Kg).

With PP powder obtained in the above Example 1 and Comparative example 1, MFR, IR-$\tau$, IR-$\tau$ of the first fraction and $M_{wl}/M_{wo}$ were measured. Further, with the PP powder, pellets were prepared and with the pellets, definite test pieces for measuring the physical properties of injection-molded products were prepared to measure their mechanical physical properties. The results are collectively shown in Table 1.

EXAMPLES 2, 3, 4, 5 and 6

In Examples 2 to 5, Example 1 was repeated except that among the preparation conditions of Example 1, the quantity of hydrogen at the time of the second stage polymerization was varied as indicated in Table 1. Further, in Example 6, Example 1 was repeated except that among the preparation conditions of Example 1, the quantity of the preactivated catalyst was made half, addition of the carboxylic acid ester was omitted and the quantity of hydrogen was varied as indicated in Table 1. With the thus obtained PP powder, MFR, IR-$\tau$, IR-$\tau$ of the first fraction and ratio of $M_{wl}/M_{wo}$ were measured and with pellets prepared from the PP powder, definite test pieces were prepared to measure the mechanical physical properties of injection-molded products, in the same manner as in Example 1. The results are shown in Table 1.

COMPARATIVE EXAMPLES 2, 3 and 4

Three kinds of PP powder of commercially available grades manufactured by Chisso Corporation (Comparative example 2: PP powder (A) of grade A 5012, MFR=2.2; Comparative example 3: PP powder (B) of grade K 1016, MFR=5.8; and Comparative example 4: PP powder (C) of grade K 1800, MFR=21.5) were pelletized and test pieces were prepared therefrom.

With the above kinds of PP powder, MFR, IR-$\tau$, IR-$\tau$ of the first fraction and ratio of $M_{wl}/M_{wo}$ were measured in the same manner as in Example 1. Further, with pellets prepared therefrom, definite test pieces were prepared according to injection-molding process to measure their mechanical physical properties. The results are shown in Table 2.

EXAMPLES 7 and 8 and Comparative example 5

In Example 7, into a 50 l capacity stainless polymerization vessel equipped with turbine type agitating blades and purged with nitrogen gas were fed propylene (18 Kg), diethylaluminum chloride(6 g) having H$_2$S (0.0008 mol) and collidine (0.0008 mol) mixed therein in advance and the preactivated catalyst of Example 1 (5 g) at room temperature, followed by raising the temperature up to 45° C., polymerizing the mixture for 15 minutes while maintaining the mixture at that temperature, further adding hydrogen (80 Nl), polymerizing the resulting material for 3 hours and 45 minutes, thereafter discharging unreacted propylene, feeding isobutanol (15 l), agitating the mixture at 90° C. for one hour, adding a 20% by weight NaOH aqueous solution (40 ml), agitating the mixture for 20 minutes, adding purified water (10 l), agitating the mixture for 10 minutes, withdrawing the resulting aqueous layer, further twice repeating washing with purified water (10 l) and withdrawal, thereafter withdrawing a PP-isobutanol slurry, filtering and drying to obtain PP powder (6.1 Kg).

Example 8 was carried out in the same manner as in Example 7 except that among the conditions of Example 7, diethylaluminum monochloride containing neither H$_2$S nor collidine was used and the conditions indicated in Table 1 were employed.

Comparative example 5 was carried out in the same manner as in Example 8 except that among the conditions of Example 8, the quantity of propylene was changed to 16 Kg, the first stage polymerization was omitted and the conditions indicated in Table 1 were employed With the respective PP powders obtained in such Examples and Comparative example, MFR, IR-$\tau$, IR-$\tau$ of the first fraction and ratio of $M_{wl}/M_{wo}$ were measured. Further, the respective PP powders were pelletized and test pieces for measuring the physical properties of definite injection-molded products were prepared from the resulting pellets to measure their mechanical physical properties. The results are collectively shown in Table 2.

EXAMPLE 9 AND COMPARATIVE EXAMPLE 6

Into a 50 l capacity stainless polymerization vessel equipped with anchor type agitating blades and purged with nitrogen gas was fed PP powder (300 g) obtained in Comparative example 1, followed by five times repeating pressurizing of propylene gas (5 Kg/ cm$^2$.G) and pressure-dropping thereof (0 Kg/cm$^2$.G), thereafter feeding diethylaluminum chloride (6 g), the preactivated catalyst of Example 1 (4 g) and methyl p-anisate (2 g) at room temperature, raising the temperature up to 60° C., pressurizing the contents with propylene gas up to 20 Kg/cm$^2$.G and carrying out polymerization at 60° C. for 20 minutes. Hydrogen gas (45 Nl) was then added, followed by further carrying out polymerization at 60° C., under 20 Kg/cm$^2$.G for 3 hours and 45 minutes, &hereafter discharging unreacted propylene gas, feeding propylene oxide (10 g) and water (30 g), agitating the mixture at 95° C. for 30 minutes, passing nitrogen gas for drying, cooling the resulting material down to room temperature and taking out PP powder.

Comparative example 6 was carried out in the same manner as in Example 9 except that the first stage polymerization was omitted and preparation conditions were varied as shown in Comparative example 6 of Table 1. With the respective PP powders of the Example and Comparative example, MFR, IR-$\tau$, IR-$\tau$ of the first fraction and ratio of $M_{wl}/M_{wo}$ were measured. Further, the respective PP powders were pelletized and test pieces for measuring the mechanical physical properties of definite injection-molded products were prepared from the resulting PP pellets to measure their mechanical physical properties. The results are collectively shown in Table 2.

As apparent from the results of Tables 1 and 2, molded products obtained from the highly crystalline PP of the present invention have not only a superior stiffness at room temperature but also a far superior stiffness particularly at 80° C.

EXAMPLES 10 AND 11 AND COMPARATIVE EXAMPLES 7 and 8

In Examples 10 and 11, a homo PP part was first obtained in the same manner as in Examples 1 to 5, followed by preparing an ethylene-propylene random copolymer part (RC part) by polymerization so that the random copolymer part could have a composition consisting of 60% by weight of ethylene and 60% by weight of propylene and also the content of the total ethylene in the resulting block copolymer as a final polymer could be 8% by weight, to obtain powder of the block copolymer.

In Comparative examples 7 and 8, a homo PP part was first obtained in the same manner as in Comparative example 1, followed by successively preparing an ethylene-propylene random copolymer (RC part) by polymerization so that the RC part could have a composition consisting of 60% by weight of ethylene and 40% by weight of propylene and also the content of the total ethylene in the resulting block copolymer as a final polymer could be 8% by weight, to obtain powder of the block copolymer.

The respective portions of the homo-PPs of these Examples and Comparative examples were withdrawn, followed by purification and drying as in Example 1 to obtain PP powders, which were then subjected to measurements of MFR, IR-$\tau$, IR-$\tau$ of the first fraction and ratio of $M_{wl}/M_{wo}$.

Further, MFRs of powders of block copolymers obtained from the above PP powders were measured. Further, the block copolymers were pelletized and test pieces for measuring the physical properties of definite injection-molded products were prepared from the pellets to measure their mechanical physical properties. The results are shown in Table 3.

As apparent from Table 3, it has so far been difficult for block copolymers to raise their stiffness without lowering their impact properties. As apparent from the results of Table 3, the block copolymers of the present invention containing a highly crystalline PP as its homo-PP part have overcome the above difficulty, and the block copolymers of Examples 10 and 11 are not only superior in the stiffness at room temperature to those of Comparative examples 7 and 8, but also particularly they are far superior therein at high temperatures.

EXAMPLES 12, 13 and 14

PP powder obtained in Example 5 was pelletized, and in this pelletization, aluminum p-tert.-butylbenzoate (0.3% by weight) (Example 12) as a nucleating agent or talc (20% by weight) (Example 13) or calcium carbonate (20% by weight) (Example 14) was additionally added to the additive used in the pelletization. Test pieces were prepared according to injection molding. The results of measurements of physical properties are shown in Table 4.

COMPARATIVE EXAMPLES 9, 10 and 11

PP powder used in Comparative example 4 was pelletized, but in this pelletization, the additionally added additives and their quantities added were as follows:
Comparative example 9: aluminum p-tert.-butylbenzoate (0.3% by weight);
Comparative example 10: talc (20% by weight); and
Comparative example 11: CaCO₃ (20% by weight).

The measurement results of mechanical physical properties are shown in Table 4.

As apparent from the results of Example 5 of Table 1 and those of Examples 12, 13 and 14 of Table 4, nucleation effectiveness and addition effectiveness of filler upon the highly crystalline PP are clearly observed as in the case of conventional PP, and by adding these, it is possible to further improve the stiffness of the highly crystalline PP. Further, as apparent from comparison of Example 13 with Comparative example 10 and that of Example 14 with Comparative example 11, when the highly crystalline PP is used, it is possible to achieve stiffness to the same extent as that of conventional PP only by adding a less quantity of filler.

EXAMPLES 15, 16 and 17

Powder of ethylene-propylene block copolymer obtained in Example 11 was pelletized, and in this case, the additionally added additives and their quantities added were as follows:
Example 15: aluminum p-tert.-butylbenzoate (0.3% by weight);
Example 16: talc (20% by weight); and
Example 17: CaCO₃ (20% by weight).

The measurement results of mechanical physical properties are shown in Table 4.

COMPARATIVE EXAMPLES 12, 13 and 14

Powder of ethylene-propylene block copolymer obtained in Comparative example 8 was pelletized, and in this case, the additionally added additives and their quantities added were as follows:
Comparative example 12: aluminum p-tert.-butylbenzoate (0.3% by weight);
Comparative example 13: talc (30% by weight); and
Comparative example 14: CaCO₃ (40% by weight).

The measurement results of physical properties are shown in Table 4.

COMPARATIVE EXAMPLE 15

A commercially available high-impact polystyrene (trademark: Stylon 492) was injection-molded and test piece was prepared, followed by measurement of physical properties. The measurement results are shown in Table 4.

In the case of the block copolymers containing the highly crystalline PP as homo-PP part, it is also possible to further make the stiffness higher without damaging impact properties due to nucleation effectiveness and filler addition effectiveness (see the measurement values of physical properties of Example 11 in Table 3 and Examples 15, 16 and 17 in Table 4). Further, by using these block copolymers, it is also possible to notably reduce the quantity of filler added while keeping the strength to nearly the same extent as that of conventional block copolymers. Namely, it is possible to reduce the quantity of talc added by 10% by weight (see Example 16 and Comparative example 13), and it is possible to reduce the quantity of CaCO₃ added by 20% by weight (see Example 17 and Comparative example 14). Further, the block copolymers of the present invention have a far higher flexural strength and flexural modulus at high temperatures (e.g. 80° C.) than those of conventional block copolymers. The firm feeling under heating extends the use applications of PP to a large extent. For example, it is possible to extend its use applications as far as those in the fields of high-impact polystyrene, ABS, etc. The polymer shown in Comparative example 15 is a high-impact polystyrene. The highly crystalline PP of the present invention has nearly the same stiffness at 23° C. as that of the polystyrene (see Examples 1 to 5 and Comparative example 15), and in the case of the block copolymer of the present invention composed basically of the highly crystalline PP, filler addition makes it possible to develop a stiffness which is the same as or higher than that of the above-mentioned polystyrene.

EXAMPLE 18 AND COMPARATIVE EXAMPLE 16

In Example 18, PP powder obtained in Example 4 was used, and in Comparative example 16, PP powder of commercially available grade manufactured by Chisso Corporation (grade name: K1008, MFR =10.3). To the respective PP powders (5 Kg) were added a phenolic heat stabilizer (0.005 Kg), calcium stearate (0.005 Kg) and fine powder of silica (average particle diameter: 0.1μ) (0.01 Kg), followed by pelletization. The respective pellets were subjected to film-making by means of a film-making machine manufactured by Yamaguchi Seisakusho Company (tradename: CYT), at a die temperature of 215° C. and at a cooling water temperature of 20° C. to prepare an inflation film having a folded width of 150 mm and a thickness of 30μ. The film was subjected to conditioning in a chamber of constant temperature (room temperature 23° C.) and constant humidity (RH 50%) for 72 hours, followed by measuring the physical properties indicated in Table 5. The measurement results of film are shown in Table 5.

The Young's modulus in Example 18 is seen to be much more improved than that in Comparative example 16.

EXAMPLE 19 AND COMPARATIVE EXAMPLE 17

In Example 19, PP powder obtained in Example 1 was used, and in Comparative example 17, PP powder of commercially available grade manufactured by Chisso Corporation (grade name: A5012; MFR=2.2).

To the respective PP powders (5 Kg) were added a phenolic heat stabilizer (0.005 Kg), calcium stearate (0.005 Kg) and fine powder of silica (average particle diameter: 0.1μ) (0.0075 Kg), followed by pelletization. The resulting pellets were extruded by a T die type film-making machine at a resin temperature of 250° C., followed by quenching by means of a cooling roll at 20° C. to prepare sheets of 1 mm thick, heating the sheets by hot air at 150° C. for 70 seconds, stretching them by means of a biaxially stretching machine to 7 times the original lengths at the same time in both the longitudinal and lateral directions to obtain biaxially oriented films of 20μ thick, subjecting the films to conditioning in a chamber of constant temperature (room temperature, 23° C.) and constant humidity (RH 50%) for 72 hours, and measuring the physical properties of the films indicated in Table 5. The measurement results of the physical properties of the films are shown in Table 5.

Even when the highly crystalline PP of the present invention is applied to biaxially oriented films, the Young's modulus is notably improved and also the secondary percentage of heat shrinkage at high temperatures is reduced to a large extent; hence it is possible to raise the drying temperature at the stage of secondary processing such as printing, etc. to thereby shorten the processing time.

EXAMPLE 20 AND COMPARATIVE EXAMPLE 18

In Example 20, PP powder obtained in Example 3 was used, and in Comparative example 18, PP powder of commercially available grade manufactured by Chisso Corporation (grade name: K1016; MFR =5.8) was used. The respective PP powders (4 Kg) were pelletized, followed by extruding the resulting pellets by means of an extruder having a bore diameter of 40 mm, a nozzle diameter of 0.5 mm and a hole number of 150, to obtain unstretched filaments of 15 d/f, followed stretching these filaments by means of a usual stretching machine at stretching ratios of 5 times, 6 times and 7 times the original length, successively subjecting the stretched filaments to heat treatment of 5% relaxing while heating them on a hot plate having a surface temperature of 130° C. to obtain filaments of 3 to 6 d and measuring the tenacity and the percentage of heat shrinkage indicated in Table 6. The measurement results are shown in Table 6.

The percentages of heat shrinkage in Example 20 is lower than those in Comparative example 18, and particularly as the temperature rises, the difference therebetween is notable. Further, the tenacity and Young's modulus are also higher.

The filament according to the present invention refers collectively to filament staple and filament of odd-shaped cross-section obtained by melt-spinning PP, stretched filament, heat-treated filament, and products converted from the foregoing, and since the percentage of heat shrinkage is improved to a large extent, it is possible to carry out heat treatment at higher temperatures at the drying step in the production process of products such as carpet; hence improvement in productivity can be expected.

TABLE 1

Production conditions of highly cystalline PP and its physical properties

| | | Example 1 | Example 2 | Example 3 | Example 4 | Example 5 | Example 6 | Comp. ex. 1 |
|---|---|---|---|---|---|---|---|---|
| Kind of carboxylic acid ester | | A | A | A | A | A | — | — |
| Amount of carboxylic acid ester (g) | | 40 | 40 | 40 | 40 | 40 | — | — |
| Amount of preactivated catalyst (g) | | 40 | 40 | 40 | 40 | 40 | 20 | 20 |
| First stage polymerization | Polymerization temp. (°C.) | 40 | 40 | 40 | 40 | 40 | 40 | |
| | Time | 15 min. | 15 min. | 15 min. | 15 min. | 15 min. | 15 min. | |
| | Amount of H$_2$ (Nl) | 0 | 0 | 0 | 0 | 0 | 0 | |
| Second stage polymerization | Polymerization temp. (°C.) | 50 | 50 | 50 | 50 | 50 | 50 | 50 |
| | Time | 3¾ hrs. | 3¾ hrs. | 3¾ hrs. | 3¾ hrs. | 3¾ hrs. | 3¾ hrs. | 4 hrs. |
| | Amount of H$_2$ (Nl) | 250 | 300 | 450 | 600 | 900 | 150 | 150 |
| Yield (Kg) | | 35 | 33 | 35.6 | 36.6 | 30 | 31 | 32 |
| C.Y. (g/g) | | 1750 | 1650 | 1780 | 1830 | 1500 | 3100 | 3200 |
| MFR (g/10 min.) | | 1.4 | 2.4 | 5.8 | 10.5 | 29 | 2.1 | 3.0 |
| IR-τ of unfractionated sample | | 0.976 | 0.983 | 0.985 | 0.991 | 1.002 | 0.965 | 0.947 |
| IR-τ of first fraction | | 1.010 | 1.020 | 1.028 | 1.041 | 1.052 | 0.980 | 0.961 |
| $M_{w-1}/M_{w-0}$ of first fraction | | 4.26 | 5.52 | 6.09 | 7.67 | 8.93 | 3.62 | 1.40 |
| Flexural modulus | | | | | | | | |
| 23° C. (Kgf/cm$^2$) | | 19000 | 19500 | 20600 | 21200 | 22700 | 16000 | 14200 |
| 80° C. (Kgf/cm$^2$) | | 5400 | 5650 | 5800 | 5810 | 6300 | 4600 | 4100 |

TABLE 1-continued

Production conditions of highly cystalline PP and its physical properties

|  | Example 1 | Example 2 | Example 3 | Example 4 | Example 5 | Example 6 | Comp. ex. 1 |
|---|---|---|---|---|---|---|---|
| Flexural strength | | | | | | | |
| 23° C. (Kgf/cm²) | 495 | 520 | 541 | 572 | 585 | 440 | 415 |
| 80° C. (Kgf/cm²) | 180 | 189 | 200 | 210 | 225 | 140 | 122 |
| Tensile strength (Kgf/cm²) | 396 | 403 | 408 | 410 | 425 | 370 | 350 |
| Hardness (R scale) | 110 | 112 | 113 | 116 | 118 | 105 | 101 |
| HDT (°C.) | 130 | 131 | 132 | 133 | 136 | 120 | 114 |
| I.I. (Kgf cm/cm) | 4.2 | 4.0 | 3.6 | 2.8 | 2.7 | 4.2 | 4.0 |

(Note)
A: methyl p-toluylate,
B: methyl p-anisate

TABLE 2

Production conditions of highly crystalline PP and its physical properties

|  | Comparative example 2 | Comparative example 3 | Comparative example 4 | Example 7 | Example 8 | Comp. ex. 5 | Example 9 | Comp. ex. 6 |
|---|---|---|---|---|---|---|---|---|
| Kind of carboxylic acid ester | PP powder (A) | PP powder (B) | PP powder (C) | — | A | A | B | B |
| amount of carboxylic acid ester (g) |  |  |  | — | 3 | 0.1 | 4 | 4 |
| Amount of preactivated catalyst (g) |  |  |  | 5 | 3 | 1.5 | 2 | 2 |
| First stage polymerization temp. (°C.) |  |  |  | 45 | 60 |  | 60 |  |
| Time |  |  |  | 15 min. | 10 min. |  | 20 min. |  |
| Amount of H₂ (Nl) |  |  |  | 0 | 0 |  | 0 |  |
| Second stage polymerization temp. (°C.) |  |  |  | 45 | 60 | 70 | 60 | 60 |
| Time |  |  |  | 3¾ hrs. | 3¾ hrs. | 4 hrs. | 3¾ hrs. | 4 hrs. |
| Amount of H₂ (Nl) |  |  |  | 80 | 100 | 50 | 45 | 40 |
| Yield (Kg) |  |  |  | 6.1 | 5.8 | 5.5 | 4.3 | 4.4 |
| C.Y. (g/g) |  |  |  | 2440 | 3867 | 7300 | 2150 | 2200 |
| MFR (g/10 min.) | 2.2 | 5.8 | 21.5 | 2.2 | 2.5 | 2.1 | 6.8 | 7.0 |
| IR-$\tau$ of unfactionated sample | 0.935 | 0.943 | 0.949 | 0.965 | 0.975 | 0.932 | 0.958 | 0.955 |
| IR-$\tau$ of first fraction | 0.956 | 0.969 | 0.961 | 0.983 | 0.994 | 0.946 | 0.983 | 0.966 |
| $M_{w\text{-}1}/M_{w\text{-}o}$ of first fraction | 1.52 | 1.80 | 2.10 | 3.26 | 3.78 | 1.40 | 4.60 | 1.60 |
| Flexural modulus | | | | | | | | |
| 23° C. (Kgf/cm²) | 12900 | 14000 | 14700 | 16400 | 16700 | 12300 | 16000 | 13000 |
| 80° C. (Kgf/cm²) | 3800 | 4000 | 4150 | 4850 | 5000 | 3600 | 4550 | 3850 |
| Flexural strength | | | | | | | | |
| 23° C. (Kgf/cm²) | 386 | 410 | 420 | 455 | 465 | 375 | 455 | 385 |
| 80° C. (Kgf/cm²) | 115 | 120 | 138 | 149 | 158 | 97 | 141 | 108 |
| Tensile strength (Kgf/cm²) | 340 | 350 | 355 | 476 | 483 | 334 | 368 | 342 |
| Hardness (R scale) | 98 | 100 | 103 | 103 | 105 | 97 | 105 | 98 |
| HDT (°C.) | 110 | 112 | 115 | 122 | 124 | 108 | 121 | 110 |
| I.I. (Kgf cm/cm) | 4.2 | 3.5 | 2.8 | 4.3 | 4.1 | 4.2 | 3.4 | 3.3 |

(Note)
A: methyl p-toluylate,
B: methyl p-anisate

TABLE 3

Physical properties of PP and physical properties of injection-molded products

|  |  | Example 10 | Example 11 | Comparative example 7 | Comparative example 8 |
|---|---|---|---|---|---|
| Homo-PP part | MFR | 19.5 | 7.1 | 20.5 | 76 |
|  | IR-$\tau$ of unfractionated sample | 0.995 | 1.003 | 0.957 | 0.964 |
|  | IR-$\tau$ of first fraction | 1.043 | 1.060 | 0.964 | 0.966 |
|  | $M_{w\text{-}1}/M_{w\text{-}o}$ of first fraction | 8.10 | 9.90 | 1.82 | 1.33 |
| MFR of final polymer (g/10 min.) | | 9.0 | 28 | 9.3 | 30 |
| Flexural modulus | | | | | |
| 23° C. (kgf/cm²) | | 15400 | 14800 | 12000 | 11300 |
| 80° C. (kgf/cm²) | | 4800 | 4250 | 2780 | 2700 |
| Flexural strength | | | | | |
| 23° C. (kgf/cm²) | | 470 | 455 | 310 | 300 |
| 80° C. (kgf/cm²) | | 155 | 150 | 105 | 100 |
| Tensile strength (kgf/cm²) | | 375 | 345 | 285 | 280 |
| Hardness (R scale) | | 100 | 100 | 96 | 95 |

TABLE 3-continued

Physical properties of PP and physical properties of injection-molded products

|  | Example 10 | Example 11 | Comparative example 7 | Comparative example 8 |
|---|---|---|---|---|
| HDT (°C.) | 128 | 121 | 103 | 100 |
| I.I. (kgf cm/cm) | 9.5 | 8.3 | 9.2 | 8.0 |

TABLE 4

Physical properties of injection-molded products of PP

|  | Example 12 | Example 13 | Example 14 | Comparative example 9 | Comparative example 10 | Comparative example 11 |
|---|---|---|---|---|---|---|
| MFR of final polymer (g/10 min.) | 28 | 23 | 22 | 23 | 21 | 15 |
| Amount of nucleating agent added (wt. %) | 0.3 | — | — | 0.3 | — | — |
| Amount of talc added (wt. %) | — | 20 | — | 13 | 30 | — |
| Amount of CaCO$_3$ added (wt. %) | — | — | 20 | — | — | 40 |
| Flexural modulus | | | | | | |
| 23° C. (kgf/cm$^2$) | 24800 | 36600 | 25200 | 16200 | 34900 | 25100 |
| 80° C. (kgf/cm$^2$) | 7000 | 9000 | 7900 | 4300 | 6500 | 5300 |
| Flexural strength | | | | | | |
| 23° C. (kgf/cm$^2$) | 602 | 632 | 547 | 478 | 558 | 410 |
| 80° C. (kgf/cm$^2$) | 210 | 220 | 212 | 155 | 150 | 140 |
| Tensile strength (kgf/cm$^2$) | 432 | 430 | 300 | 380 | 355 | 260 |
| Hardness (R scale) | 119 | 117 | 118 | 104 | 104 | 101 |
| HDT (°C.) | 144 | 150 | 139 | 121 | 146 | 121 |
| I.I. (kgf cm/cm) | 2.8 | 3.3 | 3.2 | 2.8 | 3.4 | 4.0 |

|  | Example 15 | Example 16 | Example 17 | Comparative example 12 | Comparative example 13 | Comparative example 14 | Comparative example 15 |
|---|---|---|---|---|---|---|---|
| MFR of final polymer (g/10 min.) | 28 | 24 | 22 | 29 | 26 | 20 | 3.3 |
| Amount of nucleating agent added (wt. %) | 0.3 | — | 13 | 0.3 | — | — | — |
| Amount of talc added (wt. %) | — | 20 | — | — | 30 | — | — |
| Amount of CaCO$_3$ added (wt. %) | — | — | 20 | — | — | 40 | — |
| Flexural modulus | | | | | | | |
| 23° C. (kgf/cm$^2$) | 18100 | 27000 | 19000 | 12800 | 25000 | 17050 | 21500 |
| 80° C. (kgf/cm$^2$) | 4800 | 8100 | 6100 | 3000 | 5900 | 4500 | 14300 |
| Flexural Strength | | | | | | | |
| 23° C. (kgf/cm$^2$) | 495 | 610 | 490 | 375 | 490 | 380 | 535 |
| 80° C. (kgf/cm$^2$) | 190 | 200 | 170 | 100 | 130 | 125 | 225 |
| Tensile strength (kgf/cm$^2$) | 360 | 350 | 320 | 280 | 270 | 240 | 357 |
| Hardness (R scale) | 103 | 105 | 102 | 95 | 97 | 94 | 108 |
| HDT (°C.) | 125 | 146 | 121 | 105 | 140 | 101 | 97 |
| I.I. (kgf cm/cm) | 11.6 | 9.3 | 9.5 | 11.0 | 8.6 | 9.7 | 11 |

TABLE 5

Physical properties of PP and characteristics of film

|  | IPP film Example 18 | IPP film Comp. ex. 16 | OPP film Example 19 | OPP film Comp. ex. 17 |
|---|---|---|---|---|
| MFR | 10.2 | 10.3 | 1.4 | 1.6 |
| IR-τ of unfractionated sample | 0.989 | 0.945 | 0.980 | 0.934 |
| IR-τ of first fraction | 1.037 | 0.958 | 1.013 | 0.954 |
| $M_{w-1}/M_{w-o}$ of first fraction | 7.56 | 1.60 | 4.60 | 2.98 |
| Stretchability | — | — | good | good |
| Haze (%) | 2.0 | 2.0 | 1.0 | 0.8 |
| Young's modulus (kgf/mm$^2$) | 96 | 73 | 315 | 230 |
| Punching impact strength (kgf/mm$^2$) | 5.1 | 5.3 | 8.8 | 9.0 |
| Tensile yield strength (kgf/mm$^2$) | 2.9 | 2.1 | — | — |
| Percentage of heat shrinkage (%) | | | | |
| 110° C. | — | — | 1.0 | 1.7 |
| 120° C. | — | — | 1.2 | 2.0 |
| 130° C. | — | — | 1.8 | 2.8 |

TABLE 5-continued

| | IPP film | | OPP film | |
|---|---|---|---|---|
| | Example 18 | Comp. ex. 16 | Example 19 | Comp. ex. 17 |
| 140° C. | — | — | 2.0 | 3.7 |

TABLE 6

Physical properties of PP and characteristics of filament

| | Example 20 | | | Compar. ex. 18 | | |
|---|---|---|---|---|---|---|
| MFR (g/10 min.) | 5.5 | | | 5.4 | | |
| IR-τ of unfractionated sample | 0.983 | | | 0.940 | | |
| IR-τ of first fraction | 1.025 | | | 0.957 | | |
| $M_{w\text{-}1}/M_{w\text{-}o}$ of first fraction | 5.97 | | | 1.90 | | |
| Stretchability | good | | | good | | |
| Stretching ratio (times) | 5 | 6 | 7 | 5 | 6 | 7 |
| Thinness (d) | 5.05 | 4.22 | 3.65 | 5.06 | 4.21 | 3.59 |
| Tenactiy (g/d) | 2.44 | 3.65 | 5.38 | 2.34 | 3.13 | 4.70 |
| Elongation (%) | 28 | 23 | 17 | 38 | 27 | 21 |
| 10% Young's (g/d) modulus | 23.8 | 31.9 | 45.8 | 21.3 | 28.9 | 39.7 |
| Percentage of heat shrinkage (%) | | | | | | |
| 100° C. | 1.5 | 1.9 | 1.9 | 3.6 | 3.5 | 3.7 |
| 120° C. | 1.8 | 2.2 | 2.5 | 6.7 | 7.1 | 8.5 |
| 130° C. | 4.3 | 4.6 | 4.7 | 12.1 | 13.1 | 13.9 |
| 140° C. | 5.8 | 6.1 | 6.5 | 15.4 | 17.8 | 20.2 |
| 150° C. | 10.5 | 11.6 | 13.4 | 29.2 | 31.7 | 35.7 |

What we claim is:

1. A highly crystalline polypropylene having:

(A)(i) a melt flow rate (MFR) in the range of 0.1–200 g/10 minutes 230° C. and (ii) an absorbance ratio determined by infrared absorption spectroscopy, IR-τ, of wave-number 997 cm$^{-1}$, $A_{997}$, to wave-number 973 cm$^{-1}$, $A_{973}$, which satisfies the equation:

$$\text{IR-}\tau \geq 0.0203 \log \text{MFR} + 0.950;\text{ and}$$

(B)(i) an IR-τ value of at least 0.97 of a component deposited initially in the amount of 2 to 3% by weight from a xylene solution having a polypropylene concentration of 0.2% wt./vol., cooled at a rate of about 5C.°/hr. and stirred at a rate of about 300 rpm and (ii) a ratio of the weight average molecular weight of the deposited component ($M_{wl}$) to that of said polypropylene ($M_{wo}$), $M_{wl}/M_{wo}$, of at least 3.

* * * * *

UNITED STATES PATENT AND TRADEMARK OFFICE
CERTIFICATE OF CORRECTION

PATENT NO. : 4,981,938

DATED : January 1, 1991

INVENTOR(S) : Hanari et al.

It is certified that error appears in the above-identified patent and that said Letters Patent is hereby corrected as shown below:

ON THE TITLE PAGE:
Item [57], Abstract, line 5, change "IR-$\beta$" to --IR-$\gamma$--.

Signed and Sealed this

Twenty-fifth Day of August, 1992

Attest:

DOUGLAS B. COMER

*Attesting Officer*  *Acting Commissioner of Patents and Trademarks*